United States Patent
Keshipeddy

(10) Patent No.: US 10,875,498 B2
(45) Date of Patent: Dec. 29, 2020

(54) VEHICULAR ALERT SYSTEM FOR DOOR LOCK FUNCTION

(71) Applicant: Magna Electronics Inc., Auburn Hills, MI (US)

(72) Inventor: Prathyush Kumar Keshipeddy, Auburn Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/583,302

(22) Filed: Sep. 26, 2019

(65) Prior Publication Data

US 2020/0094778 A1 Mar. 26, 2020

Related U.S. Application Data

(60) Provisional application No. 62/736,482, filed on Sep. 26, 2018.

(51) Int. Cl.
*B60Q 1/00* (2006.01)
*B60R 25/10* (2013.01)
*B60Q 5/00* (2006.01)
*B60R 25/24* (2013.01)

(52) U.S. Cl.
CPC .............. *B60R 25/10* (2013.01); *B60Q 5/005* (2013.01); *B60R 25/24* (2013.01); *B60R 2325/205* (2013.01)

(58) Field of Classification Search
CPC ... B60R 25/10; B60R 25/24; B60R 2325/205; B60Q 5/005
See application file for complete search history.

(56) References Cited

U.S. PATENT DOCUMENTS

| | | | |
|---|---|---|---|
| 5,550,677 A | 8/1996 | Schofield et al. | |
| 5,568,120 A * | 10/1996 | LeMense | B60R 25/1003 180/257 |
| 5,670,935 A | 9/1997 | Schofield et al. | |
| 5,949,331 A | 9/1999 | Schofield et al. | |
| 6,275,141 B1 | 8/2001 | Walter | |
| 6,819,922 B1 * | 11/2004 | Janz | H04B 1/3833 455/420 |
| 6,836,209 B2 | 12/2004 | Ploucha | |
| 7,026,930 B2 | 4/2006 | Appel et al. | |
| 7,280,035 B2 | 10/2007 | McLain et al. | |
| 7,528,703 B2 | 5/2009 | Touge | |
| 7,547,058 B2 | 6/2009 | King et al. | |
| 8,638,205 B2 | 1/2014 | Boehme et al. | |
| 8,830,317 B2 | 9/2014 | Meier | |

(Continued)

*Primary Examiner* — Phung Nguyen
(74) *Attorney, Agent, or Firm* — Honigman LLP

(57) ABSTRACT

A vehicular alert system includes a door locking control disposed at a vehicle and operable to lock a plurality of doors of the vehicle responsive to a door lock signal received from a remote transmitter carried by a user. The remote transmitter is operable to transmit a triggering signal to the door locking control. Responsive to the transmitted triggering signal, the door locking control locks the doors of the vehicle. Responsive to the transmitted triggering signal, the vehicular alert system determines whether at least one door of the vehicle is not fully closed. Responsive to determination that at least one door of the vehicle is not fully closed, the vehicular alert system generates an alert to alert the user that at least one door of the vehicle is not fully closed.

15 Claims, 3 Drawing Sheets

(56) References Cited

U.S. PATENT DOCUMENTS

| | | |
|---|---|---|
| 9,068,390 B2 | 6/2015 | Ihlenburg et al. |
| 9,440,618 B2 * | 9/2016 | Patel ........................ B60R 25/10 |
| 2002/0084675 A1 | 7/2002 | Buchanan et al. |
| 2005/0283286 A1 | 12/2005 | Kanda et al. |
| 2007/0008088 A1 | 1/2007 | Nantz et al. |
| 2007/0236364 A1 | 10/2007 | Hubbard et al. |
| 2007/0273554 A1 | 11/2007 | Sakakibara |
| 2007/0296242 A1 | 12/2007 | Frommer et al. |
| 2008/0294314 A1 | 11/2008 | Morris et al. |
| 2009/0000196 A1 | 1/2009 | Kollar et al. |
| 2009/0113961 A1 | 5/2009 | Muller |
| 2010/0039248 A1 * | 2/2010 | Mauro ..................... B60Q 9/00 340/438 |
| 2011/0043633 A1 | 2/2011 | Sarioglu et al. |
| 2011/0196568 A1 | 8/2011 | Nickolaou et al. |
| 2013/0141212 A1 | 6/2013 | Pickering |
| 2013/0235204 A1 | 9/2013 | Buschmann |
| 2014/0091906 A1 | 4/2014 | Lee |
| 2014/0139331 A1 | 5/2014 | Oliver |
| 2014/0168415 A1 | 6/2014 | Ihlenburg et al. |
| 2014/0168437 A1 | 6/2014 | Rother et al. |
| 2014/0218529 A1 | 8/2014 | Mahmoud et al. |
| 2015/0304406 A1 | 10/2015 | Penilla et al. |
| 2016/0010366 A1 | 1/2016 | Rowe |
| 2016/0048249 A1 | 2/2016 | Chen et al. |
| 2016/0304055 A1 * | 10/2016 | Murugesan ............. B60R 25/10 |
| 2018/0154864 A1 | 6/2018 | Kunze et al. |

* cited by examiner

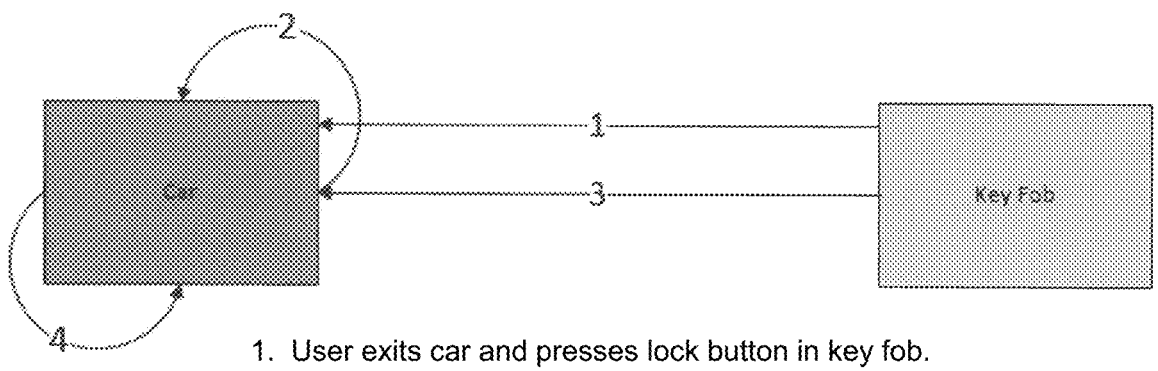

1. User exits car and presses lock button in key fob.
2. Car locks all doors.
3. User presses lock button a second time.
4. Car checks whether all doors are locked, hood is closed, then plays a beep or horn. If either of them is not locked or closed, then instead of silence, the car plays horn in a rhythm or plays it twice or thrice to draw user attention.

FIG. 2

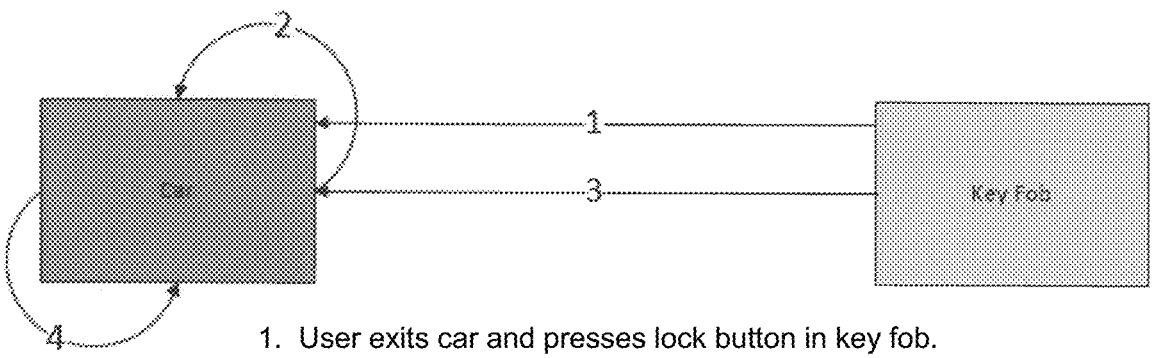

1. User exits car and presses lock button in key fob.
2. Car locks all doors.
3. User presses lock button a second time.
4. Car checks whether all doors are locked, hood is closed, and also whether all door mirrors or windows are closed, then plays a beep or horn. If any of them is not satisfied, then instead of silence, the car plays horn in a rhythm or plays it twice or thrice to draw user attention.

FIG. 3

VEHICULAR ALERT SYSTEM FOR DOOR LOCK FUNCTION

CROSS REFERENCE TO RELATED APPLICATION

The present application claims the filing benefits of U.S. provisional application Ser. No. 62/736,482, filed Sep. 26, 2018, which is hereby incorporated herein by reference in its entirety.

FIELD OF THE INVENTION

The present invention relates to door locking and unlocking devices and systems for vehicles.

BACKGROUND OF THE INVENTION

When a person exits a vehicle, if all the doors are closed, then the vehicle locking system locks the doors responsive to actuation of a button of a key fob. In some applications, a first press of the button locks the doors, and a second press of the button causes the vehicle's horn to sound. If one of the doors is not closed, the system may not lock that door, but the person exiting the vehicle would not be aware of that situation.

SUMMARY OF THE INVENTION

The present invention provides a vehicular door locking and alert system that provides an alert to a person attempting to lock the doors of the vehicle upon exiting the vehicle. The alert is provided to alert the user that one of the doors is not closed all the way and/or that one of the vehicle windows is not fully closed. The alert may be generated at the vehicle and/or at a portable device carried by the user or owner of the vehicle.

These and other objects, advantages, purposes and features of the present invention will become apparent upon review of the following specification in conjunction with the drawings.

BRIEF DESCRIPTION OF THE DRAWINGS

FIG. 2 is a block diagram showing operation of the locking and alert system of the present invention if one of the doors is not fully closed;

FIG. 3 is a block diagram showing operation of the locking and alert system of the present invention if one of the doors is not fully closed or if one of the windows is not fully closed.

DESCRIPTION OF THE PREFERRED EMBODIMENTS

Figure 1:
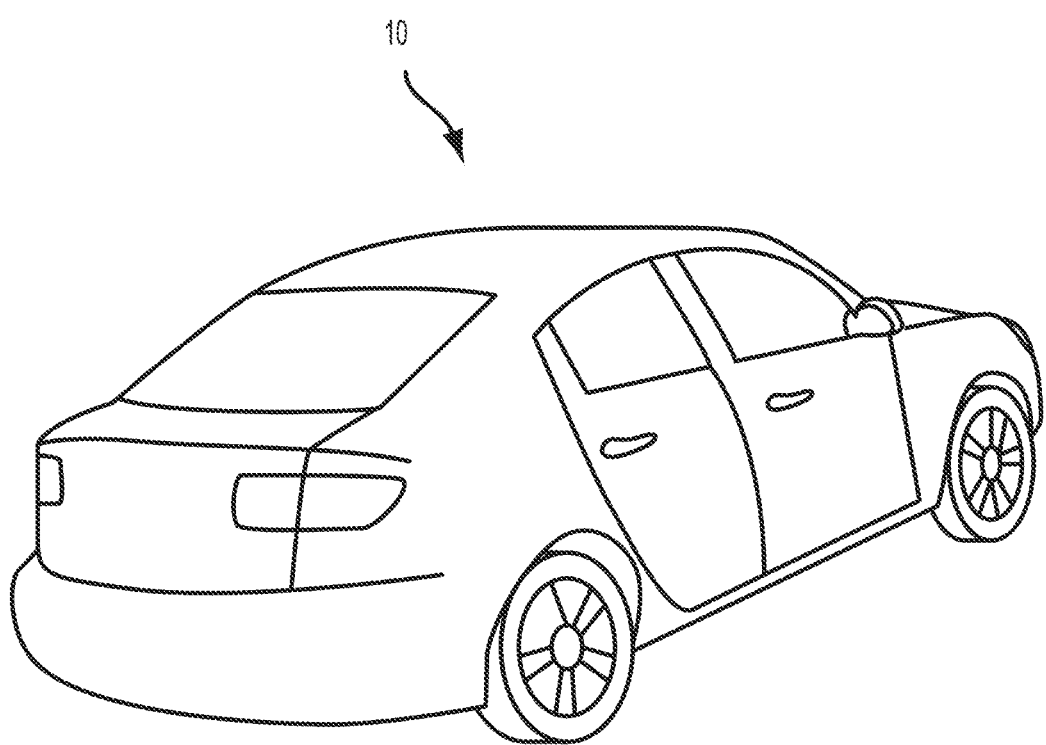
FIG. 1 is a perspective view of a vehicle that has an automatic opening and closing deck lid or hatch in accordance with the present invention.

Referring now to the drawings and the illustrative embodiments depicted therein, a vehicle 10 (FIG. 1) has doors that are locked and unlocked via actuation of a remote transmitter or key fob or the like. A locking and alert system provides the remote door locking function and generates an alert responsive to multiple actuations of the transmitter or key fob or smart phone, or responsive to movement of the transmitter a threshold distance from the vehicle. For example, if the user actuates the transmitter or fob a first time to lock the vehicle doors, the locking and alert system locks the doors and, if the user actuates the transmitter a second time, the system may generate an alert, such as a haptic alert or visual alert or audible alert, such as sounding or chirping the vehicle horn. The locking and alert system further provides that, if one of the vehicle doors is not fully closed, a different alert or sound is generated (upon actuation of the transmitter) to alert the user that one of the vehicle doors is not fully closed and thus may not be securely locked. For example, one of the doors may be not closed or latched at all or may be partially closed and latched via a first latching mechanism, but not fully closed and latched via the second latching mechanism. Also, the locking system may provide that, if one of the vehicle windows is not fully closed, a different alert or sound is generated (upon actuation of the transmitter) to alert the user that one of the vehicle windows is not fully closed.

The system thus provides a mechanism or device or system at the vehicle to warn the user with a different haptic alert or different rhythm horn or multiple chirps (e.g., two or three actuations of the horn instead of a single activation or sound) when the transmitter communicates to the system to actuate a door lock feature in a situation where one or more of the doors is not fully closed and/or one or more of the windows is not fully closed. This indicates to the user that something is not closed and may need attention before the user walks away from the vehicle.

For example, and such as shown in FIG. 2, when the user exits the vehicle and presses the lock button on the vehicle key fob, the vehicle locking and alert system locks all of the doors of the vehicle (including the liftgate or decklid). When the user presses the lock button a second time, the system checks (such as via processing signals received via a communication bus of the vehicle) to determine whether or not all of the doors are locked and that the decklid and hood are closed. The system may receive signals from a door control module at each door of the vehicle, with the signals communicated from the door control module to the control of the system via a communication bus or network of the vehicle (such as a Controller Area Network (CAN) bus or the like). If one of the doors is not locked or closed, then the system may not actuate the horn, or optionally may actuate the horn in a different pattern (such as a rhythm pattern or multiple actuations) to alert the user that something is not closed.

Optionally, and such as shown in FIG. 3, when the user exits the vehicle and presses the lock button on the vehicle key fob, the vehicle locking system locks all of the doors of the vehicle (including the liftgate or decklid). When the user presses the lock button a second time, the system checks (such as via processing signals received via a communication bus of the vehicle) to determine whether or not all of the doors are locked and that the decklid and hood are closed, and that all of the vehicle windows are closed, and then sounds the horn (such as a single actuation or chirp of the horn). If one of the doors is not locked or closed or if one of the windows (such as door windows or sunroof or rear window or the like) is not fully closed, then the system actuates the horn in a different pattern to alert the user that something is not closed and requires attention before leaving the vehicle. The different horn pattern may comprise two or three quick actuations of the horn or a rhythm actuation or the like, so that the user readily understands that there is something not fully closed and locked. Optionally, a different horn pattern may be generated when a door is not closed as compared to the horn pattern that is generated when a window is not closed, so the user can readily know which issue needs attention.

Figure 4:
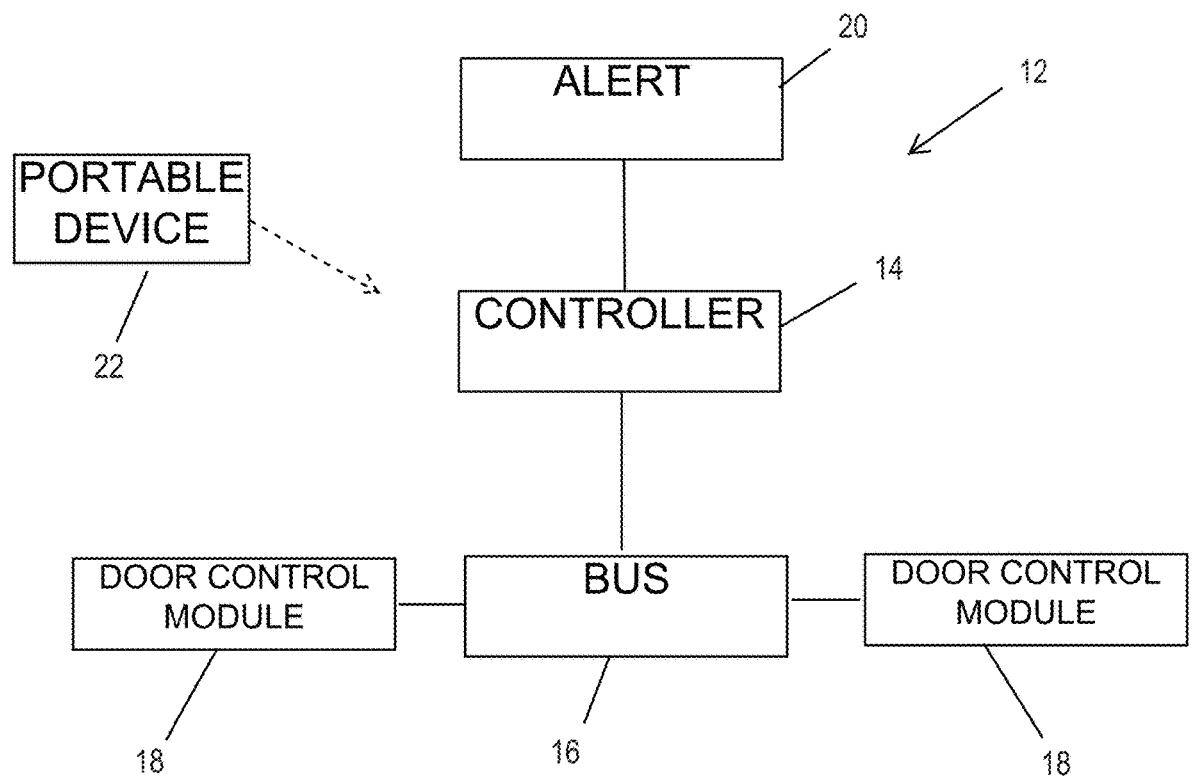
FIG. 4 is a block diagram of the vehicular locking and alert system.

As shown in FIG. 4, the system 12 includes a controller 14 that receives a signal (or multiple signals) via a network bus 16 of the vehicle. The signals are derived from outputs of the door control modules 18 at each door of the vehicle (and optionally a signal from a sunroof control module of a sunroof of the vehicle that is indicative of the sunroof of the vehicle being fully closed or at least partially opened). Responsive to the signal(s) received at the controller 14, the controller generates an alert output 20, which may provide an alert at the vehicle or at the transmitter, such as by actuating the vehicle horn (or other audible device, such as a loudspeaker of the vehicle) to alert the user that the doors are fully closed and locked and windows are fully closed or that one or more doors are not fully closed or that one or more windows are not fully closed. The controller operates to determine the opened/closed status of the doors and windows responsive to a signal received from the remote transmitter or key fob 22. For example, the controller may receive a signal or otherwise may operate to lock the doors and/or determine the opened/closed status of the doors and/or windows responsive to the remote transmitter being at least a threshold distance from the vehicle or responsive to activation of a user input of the remote transmitter.

Although described above as comprising a key fob having at least one user actuatable input for triggering the signal to the door locking and alert system, the remote transmitter may comprise a device (such as a fob or a smart phone or the like) that automatically generates or communicates the signal to the alert system responsive at least in part to a distance of the device from the vehicle. For example, the remote transmitter may comprise a device (e.g., a smart phone or other portable device) that, as the user is walking away from the vehicle, and when the user (and smart phone) is at a threshold distance from the vehicle, generates a signal to the locking and alert system at the vehicle, whereby the system locks vehicle doors and determines whether all of the vehicle doors are fully closed or whether at least one door is not fully closed. Responsive to determination that one or more of the vehicle doors (and/or one or more of the vehicle windows) is not fully closed, the locking and control system may communicate a signal to the remote device, whereby the remote device generates the alert (e.g., the remote device may vibrate, such as at a selected rate or pattern). Optionally, responsive to determination that all of the vehicle doors are fully closed, the locking and control system may communicate a confirmation signal to the remote device, whereby the remote device generates the alert (for example, the remote device may vibrate at a different rate or pattern than it does for the open door/window alert) to confirm to the user that the doors are fully closed and locked.

Optionally, the remote device may also provide a visible alert responsive to determination that one or more of the vehicle doors is not fully closed. For example, a display screen of the smart phone may display an avatar of the vehicle, with the not fully closed door (or window) highlighted or shown in a different color (e.g., red), so the user can readily determine which door and/or window needs to be closed. Thus, the user, upon feeling the alert vibration that is indicative of a door (or window) not being fully closed, can view the display screen of the device to determine which door (or window) is determined to be not fully closed.

Thus, the present invention provides a system that avoids security problems when one or more of the doors and/or windows of the vehicle are not fully closed when the user exits the vehicle and locks the doors via a communication or signal the remote transmitter or key fob or smart phone. The system reduces the risk of the user leaving the vehicle unsecured by alerting the user when an open door or window is detected.

The system may utilize aspects of the systems described in U.S. Pat. No. 9,068,390 and/or U.S. Publication Nos. US-2018-0154864 and/or US-2011-0043633, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular alert system, said vehicular alert system comprising:
    a door locking control disposed at a vehicle and operable to lock a plurality of doors of the vehicle responsive to a door lock signal received from a remote transmitter carried by a user;
    wherein the remote transmitter is operable to transmit a triggering signal to said door locking control;
    wherein, responsive to the transmitted triggering signal, said door locking control locks the plurality of doors of the vehicle;
    wherein, responsive to the transmitted triggering signal, said vehicular alert system determines whether all of the doors of the plurality of doors of the vehicle are fully closed or at least one door of the plurality of doors of the vehicle is not fully closed;
    wherein, responsive to determination that all of the doors of the plurality of doors of the vehicle are fully closed, said vehicular alert system generates a first alert to confirm to the user that all of the doors of the plurality of doors of the vehicle are fully closed and locked;
    wherein, responsive to determination that at least one door of the plurality of doors of the vehicle is not fully closed, said vehicular alert system generates a second alert to alert the user that at least one door of the plurality of doors of the vehicle is not fully closed;
    wherein the second alert is different than the first alert;
    wherein, responsive to the transmitted triggering signal, said vehicular alert system determines if at least one window of the vehicle is not fully closed, and wherein, responsive to determination that at least one window of the vehicle is not fully closed, said vehicular alert system generates a third alert to alert the user that at least one window of the vehicle is not fully closed; and
    wherein the third alert is different than the second alert, and wherein the third alert is different than the first alert.

2. The vehicular alert system of claim 1, wherein said vehicular alert system determines whether at least one window of the vehicle is not fully closed via processing at least one signal communicated via a communication bus of the vehicle.

3. The vehicular alert system of claim 1, wherein said vehicular alert system determines whether at least one window of the vehicle is not fully closed via signals communicated from a door control module at each door of the plurality of doors of the vehicle.

4. The vehicular alert system of claim 1, wherein said vehicular alert system determines whether at least one door of the plurality of doors of the vehicle is not fully closed via processing at least one signal communicated via a communication bus of the vehicle.

5. The vehicular alert system of claim 1, wherein said vehicular alert system determines whether at least one door of the plurality of doors of the vehicle is not fully closed via signals communicated from a door control module at each door of the plurality of doors of the vehicle.

6. The vehicular alert system of claim 1, wherein the first alert comprises at least one selected from the group consisting of (i) an audible alert, (ii) a visible alert and (iii) a haptic alert.

7. The vehicular alert system of claim 1, wherein the first alert comprises a haptic alert generated at the remote transmitter.

8. The vehicular alert system of claim 1, wherein the first alert comprises an audible alert generated at the vehicle.

9. The vehicular alert system of claim 1, wherein the remote transmitter comprises a smart phone.

10. The vehicular alert system of claim 1, wherein the remote transmitter transmits the triggering signal to said door locking control responsive to determination that the remote transmitter is a threshold distance from the vehicle.

11. The vehicular alert system of claim 10, wherein the first alert comprises vibration of the remote transmitter.

12. The vehicular alert system of claim 10, wherein the second alert comprises a visual alert displayed at the remote transmitter, and wherein the displayed visual alert indicates to the user which door of the plurality of doors is determined to be not fully closed.

13. The vehicular alert system of claim 1, wherein the remote transmitter transmits the triggering signal responsive to actuation by the user of a user input of the remote transmitter.

14. The vehicular alert system of claim 13, wherein said door locking control locks the plurality of doors of the vehicle responsive to a first actuation of the user input, and wherein, responsive to a second actuation of the user input, said vehicular alert system determines whether all of the doors of the plurality of doors of the vehicle are fully closed or at least one door of the plurality of doors of the vehicle is not fully closed.

15. The vehicular alert system of claim 1, wherein the first alert comprises actuation of a horn of the vehicle in a first pattern, and wherein the second alert comprises actuation of the horn of the vehicle in a second pattern that is different than the first pattern.

\* \* \* \* \*